3,280,627
Patented Oct. 25, 1966

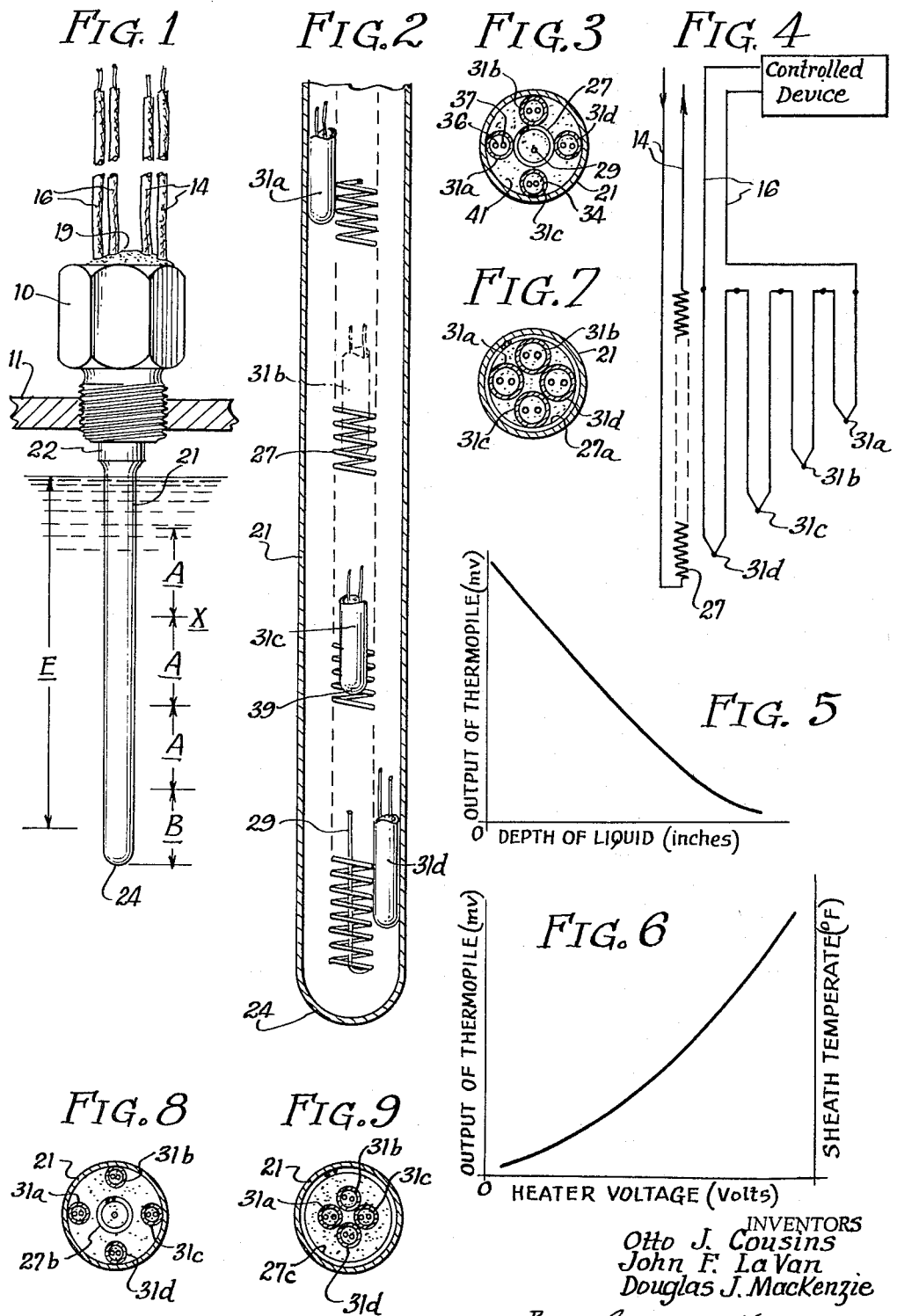

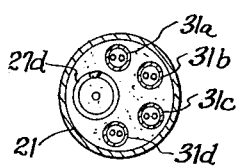
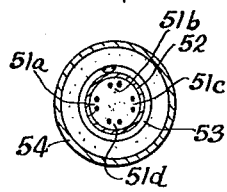
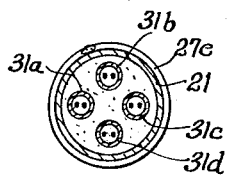
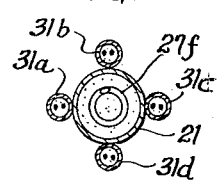
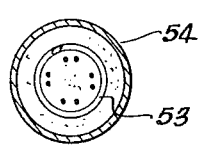
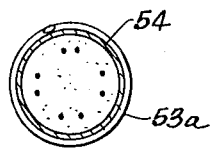
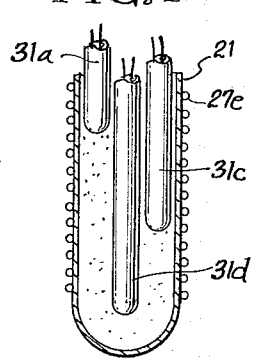
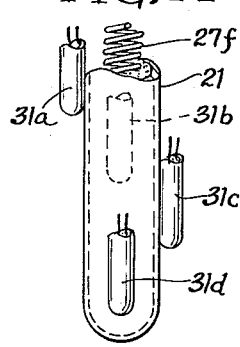
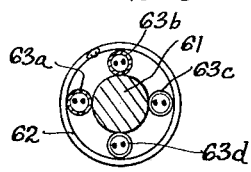
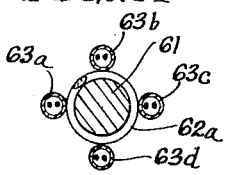
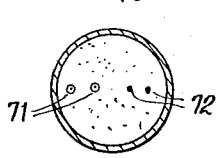
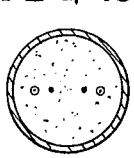
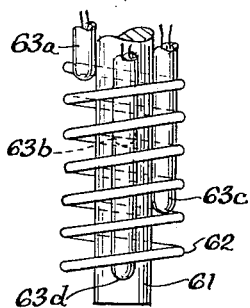
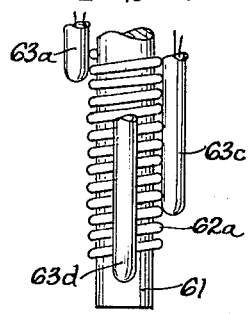
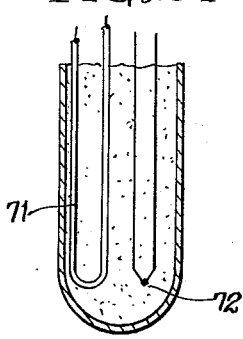
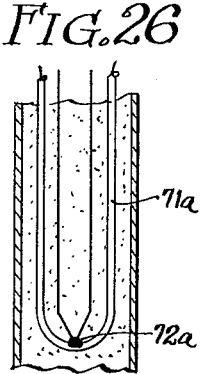
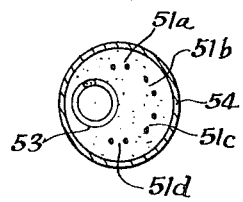

3,280,627
LIQUID LEVEL SENSOR

Otto J. Cousins, Chicago, John F. La Van, Oak Park, and Douglas J. MacKenzie, Park Ridge, Ill., assignors to American Radiator & Standard Sanitary Corporation, New York, N.Y., a corporation of Delaware
Filed May 27, 1963, Ser. No. 283,346
5 Claims. (Cl. 73—295)

This invention relates to a device for sensing the depth of a liquid in terms of some predetermined normal level and providing an electrical signal proportional to the depth for control or indicating purposes. The liquid may be in a static or dynamic state, viz. contained in a reservoir and subject only to changes in the level or the same may be flowing in a conduit at a variable rate such as results in alteration in the level.

A principal object of the invention is to provide a device for the purpose aforesaid which will yield an electrical output measurable as the voltage generated by a thermocouple or thermopile.

Another important object is to provide a device as stated which has no moving parts subject to inertia and therefore no reading errors of the type resulting from mechanical lag. Moreover by the elimination of moving parts, as for example, a float and linkage, it is possible to read an average depth notwithstanding rapid fluctuations in the level, either of the body of liquid as a whole or undulations which disturb the surface zone only.

A further object is to provide a device of the foregoing character which is rugged, requires no maintenance, such as lubrication or cleaning and which, while utilizing an electric heater, draws very little current.

Other objects and advantages will become apparent from the ensuing description which, taken with the accompanying drawing, discloses various forms in which the principles of the invention may be embodied in practice.

In this drawing:

FIG. 1 is a side elevation of the device and its mounting shown in its relation to a body of liquid confined in a space;

FIG. 2 is a magnified longitudinal cross section of the device;

FIG. 3 is a transverse cross section through the several thermocouple assemblies constituting the thermopile and the associated heater;

FIG. 4 is a circuit diagram of the thermopile and heater;

FIG. 5 is a graph to illustrate the linear relation between depth of liquid and thermopile output;

FIG. 6 is another graph to assist in the description of the function of the device;

FIGS. 7 to 14 inclusive, are cross sections similar to FIG. 3, together with side elevational views showing modified constructions;

FIGS. 15 to 18 inclusive, illustrate in cross section, further embodiments;

FIGS. 19 to 22 inclusive, illustrate in cross section and side elevation, still other embodiments;

FIGS. 23 and 24 are cross sections, transversely and longitudinally, of a further embodiment; and FIGS. 25 and 26 are cross sections, transversely and longitudinally, of an additional embodiment.

Broadly regarded, the invention device comprises a support, either a housing or rod, carrying an electric heater and a plurality of thermocouples i.e. thermoelectric junctions, connected in series to constitute a thermopile. The thermocouples per se are of any well known type e.g. Chromel-Alumel, preferably individually housed in a tubular metallic sheath with a suitable refractory of electrically-insulating character serving to support the wires and to electrically isolate them from each other and from the sheath, or the thermocouples may be unsheathed if electrically isolated and suitably protected against damage. The leads from the several thermocouples are brought out through any suitable mounting arrangement including a hollow head. The several thermocouples are connected in series, desirably within the mounting head, to constitute a thermopile whereby the voltages are combined for greater effect and such total voltage is applied to an indicating instrument or some control apparatus, usually via an amplifier. The leads from the heater are also brought out through such mounting head whereby a current supply may be connected to the heater. The arrangement of the thermocouple sheaths, the heater and the housing or support is such that they are in heat-exchanging relation with each other to function in a manner to be described. The working end of each thermocouple is at a different distance along the vertical axis of the device so that for the lowest expected level of liquid one thermocouple is below, or approximately at the liquid level; for some higher level two thermocouples are below the liquid level and so on. The spacing between thermocouples is established by suitable test conditions and may be equal or various, the desideratum being a response curve between depth of liquid and output voltage which is as nearly linear as possible for uniform graduations on the scale of an indicating instrument or, in the case of a controlled device, for linearity of response thereof. It has been determined that with thermocouples of substantially equal output, subject to equal heating by the heating element and in substantially equal heat-exchanging relation with the housing or support the working end of the several thermocouples may be equally spaced, but such spacing may be at varying distances depending upon the degree of interaction between the thermocouples, the heating element, the outer housing or support and the surrounding liquid under the operating conditions. Predetermination of the spacing by mathematical methods presents a rather arduous task so that it is preferred to establish the same by empirical methods, meanwhile plotting the readings to ascertain optimum linearity. It will be understood that, by positioning the working end of each thermocouple at a different level, each one is inserted in, or withdrawn from the series circuit forming the thermopile as the liquid level rises and falls, this becoming evident when it is noted that the voltage generated by each thermocouple junction depends on the temperature which each junction "sees" and that such temperature will induce reliable response of the junction only when the zone to which the junction is obliged to respond is restricted. Accordingly, each of the junctions is influenced by a localized condition and this condition is a function of the heat dissipated from the housing or support and the components carried thereby to the liquid in the case where the housing or support is at a higher temperature than the liquid, and is a function of the heat absorbed from the liquid when the reverse situation obtains. When a stainless steel housing or support is employed the device may serve a range of temperatures of the liquid up to about 1800° F., and greater when noble metals are used, and down to the cryogenic range, say as low as —300° F. when the metal of the housing or support and any exposed parts are suitably selected to avoid embrittlement. From the foregoing it will have become clear that the exchange of heat between the device and the liquid as the one factor and the exchange of heat between the housing or support, the thermocouples (including their several components) and the heating element, regarded as another factor, will provide an electromotive force from the thermopile which varies in proportion to the depth of liquid. Desirably, in the interests of simplicity of construction and compactness the heating element is of the type comprising an elongated outer sheath of malleable metal which may be deformed into helical, hairpin or other shape on a minimum radius consonant with the acceptable dimensions and geometry of the device, a conductor or conductors of "resistance" wire, e.g. Nichrome, within the sheath and a suitable, electrically-insulating refractory material, e.g. compacted powdered magnesium oxide or pellets, serving to space the wires with respect to the sheath and to each other. The mounting head previously referred to includes any suitable means for mounting the device in the wall of the reservoir or conduit in which the liquid is confined.

Adverting to the drawing there is shown, by way of example, one preferred form of a device in accordance with the invention comprising a head or fitting 10 of any suitable type e.g. adapted to be threadedly engaged in a wall or other support 11. The interior of the fitting will be sufficiently capacious for use in connecting the terminal leads 14 of the heater to the ends thereof and the thermocouples to each other in series, with the ends of the series group connected to a pair of terminal leads 16. A suitable potting compound 19 binds the leads to the device and supports and insulates the various wires and joints. If desired, the ends of the heater and of the thermocouples may be otherwise connected to the exterior leads. However, the mode of connection is conventional and is not to be regarded as a limiting feature of the invention. It will be understood that the leads 14 are connected to a source of current, and the leads 16 to an amplifier to operate an indicating instrument or some controlled device responsive to the level of the liquid, e.g. a make-up supply.

The housing for the heating element and thermocouples is a tube 21 welded, brazed or otherwise secured at 22 to the fitting 10 and closed at the bottom 24. A heating element 27 in the form of a helix, for example, is positioned within the housing and its ends are connected to the terminal leads 14. In the example the heater includes a single wire, e.g. Nichrome, carried in a metallic sheath together with an electrically-insulating refractory supporting and spacing the wire with respect to the sheath. The return end of the coiled heater is indicated at 29.

In the example, four thermocouples 31a, 31b, 31c and 31d are employed and are symmetrically distributed about the periphery of the heater 27. It is not essential that the several thermocouples be equiangularly arranged but, from a manufacturing standpoint, this may be preferred. Important factors are that the working end of the thermocouples be spaced axially of the housing 21, and that all of the thermocouples be heated substantially equally. As mentioned above, this spacing, based on uniformity of response of the several thermoelectric junctions and expected symmetry generally of the thermocouples, will be found to be substantially equal, but is not to be regarded as necessarily so.

Each thermocouple is of a conventional type, i.e. comprising a metallic sheath 34, a pair of thermocouple wires 36 and 37, e.g. Chromel and Alumel, twisted, welded or otherwise joined at one end to constitute a thermoelectric junction adjacent the closed end 39 of the sheath, together with an electrically-insulating refractory matrix, all in accordance with known practice.

In one actual embodiment of the invention the thermocouples were so arranged in a longitudinal sense that the thermoelectric junctions were 1½" apart, as indicated at A (FIG. 1) with the lowermost one 1" from the bottom of the housing. Obviously the total length of each thermocouple will be different, in order that the upper ends may be suitably supported as by welding, brazing or clamping. Further, to provide support for the heating element and the thermocouples, the voids therebetween are desirably filled with a compacted, powdered refractory 41, e.g. magnesium oxide.

From FIG. 3 it will be noted that, in the example, the housing, heater and thermocouples are in heat-conducting relation. These several components may be otherwise arranged as shown in FIGS. 7 to 10. In FIG. 7 the helically formed heater 27a is adjacent the housing 21 and the thermocouples 31a, etc. are enclosed therewithin in a tangential symmetrical arrangement. In FIG. 8 the arrangement is similar to that of FIG. 3 but with the heater 27b and the thermocouples 31a, etc. spaced apart in a symmetrical array. In FIG. 9 the arrangement is similar to that of FIG. 7 but with the heater 27c spaced from the symmetrically arranged thermocouples 31a, etc. These latter two embodiments are included to point up that actual contiguity between the housing, heater and thermocouples is not essential since conduction occurs through the refractory matrix. Moreover, this matrix may be omitted and heat exchange allowed to occur by radiation and/or convection. Nor, for the same reason, is it necessary that the heater or thermocouples have mechanical contact with the housing. However, since such contact provides optimum heat transfer it is preferred. On the other hand, the snug fitting of the several components into the housing may present difficult problems of assembly and some clearance is then advisable.

FIG. 10 depicts another arrangement wherein the heater 27d is to one side of the central axis of the housing 21 and the thermocouples 31a, etc., occupy portions of the remaining space asymmetrically. This embodiment is included to illustrate that the thermocouples need not be symmetrically arranged about the central axis only so long as the junctions thereof are spaced therealong in the manner of FIG. 2. FIGS. 11 and 12 are to be considered together and show a modification in which the thermocouples 31a, etc., are within the housing 21 but the heater 27e is coiled around and supported on the exterior of the housing by tack welding or other expedient. The arrangement of FIGS. 13 and 14 shows the heater 27f within the housing 21 as in FIG. 2 but the thermocouples 31a, etc., on the exterior thereof. The thermocouples may be secured to the housing by means of any recognized expedient. Again, it is not essential that the thermocouples be symmetrically arranged. Moreover, it will be noted that the respective working ends of the thermocouples as shown in FIGS. 12 and 14 are in spaced relation along the central axis but, to conserve space, are not shown as far apart as in FIG. 2.

The device operates on the principle that the rate of heat transfer between the portion of the device exposed to atmospheric air or, in the case of a receptacle or conduit subject to a vacuum, then exposed to air at less than atmospheric pressure, is less than between the device and a body of liquid. Since the response of the several thermocouples is a function of the temperatures obtaining over the region served by each thermocouple and, since such temperatures are, in turn, a function of the rate at which heat is exchanged between the liquid and the immersed portion E of the device and the rate at which heat is exchanged between the air or vacuum above the liquid level, the thermopile will provide an output voltage which is a measure of the extent to which the device is immersed, viz., the liquid level.

Assuming that the liquid has a level at X and is at a uniform temperature throughout then the thermocouples 31b, 31c and 31d will sense some temperature which is a function of the rate at which heat is being exchanged between the device and the body of liquid. If the liquid is cooler than the device then heat will be transferred to the liquid and the thermocouples 31b, 31c and 31d will sense a drop in temperature and vice versa, if the liquid is hotter than the device these thermocouples will sense a rise in temperature. Since the temperature of the air above the liquid level will be different than the liquid, the thermocouple 31a may add or subtract from the total output of the thermocouple depending upon the circumstances. If liquid is added to the receptacle to raise the level X then the thermocouple 31a will come into play in accordance with the temperature of the liquid, and the output of that thermocouple will be added to the total output. Similarly, as the liquid level drops below X, the voltage of the thermocouples 31b, 31c and 31d are successively subtracted from the thermopile output if the conditions are such that the thermocouples are being subjected to a falling temperature and, vice versa if they are being subjected to a rising temperature. This same behavior will prevail if the liquid level is rising.

It will be apparent that the response of each thermocouple will depend on the average temperature in its immediate locality. Thus, if the performance curve is to be reasonably smooth the thermocouples will be spaced close together, but if a step-type curve is acceptable then the spacing may be greater and the number of thermocouples less with consequent lower cost.

As an example, a device was constructed in accordance with the invention as follows:

With the heater isolated from the housing and with a power input thereto of approximately 3.2 watts at 10 volts, the housing attained a temperature of 200° F. in air at 75±5° F. and the thermopile output was 20 mv. The heater had a maximum rating of 25 watts at 28 volts.

With the heater consuming 3.2 watts the device was immersed in water at 75±5° F. and the amount of immersion was varied between 0″ and 6″.

The results yielded a curve relating thermopile output to depth of immersion of the form shown in FIG. 5 which, as may be observed, is virtually linear throughout. FIG. 6 shows the output of the thermopile as it is related to the heater voltage, and this latter as it is related to the sheath temperature.

To assist in a fuller understanding of the principles underlying operation of the invention device the following analysis is presented:

When a heater is energized by a constant source of power, it dissipates its energy by radiation, conduction and convection to its surroundings, as well as storing heat. Thus, $$Q_a = Q_r + Q_k + Q_c + Q_m$$

where $Q_a$ = rate of energy input
$Q_r$ = rate at which energy is dissipated by radiation
$Q_k$ = rate at which energy is dissipated by conduction
$Q_c$ = rate at which energy is dissipated by convection
$Q_m$ = rate at which energy is stored as heat At stabilized conditions, $Q_m$ becomes zero, since $dT/dt$ (rate of change of temperature with time) is zero.

At sufficient depths of immersion, $Q_k \to 0$

At sufficiently low temperatures $Q_r$ becomes negligible compared to $Q_c$.

Therefore:

$$Q_a = Q_c$$

or $$E^2/R = hA_s(T_p - T_a)$$

where $E^2/R$ = electrical power dissipated
$h$ = coefficient of heat transfer
$A$ = surface area
$T_p$ = probe temperature
$T_a$ = ambient temperature (The "probe" referred to is the housing with its therein contained heater and thermocouple.)

If $E^2/R$ and $A_s$ are constants we have $$1/h = K(T_p - T_a)$$

From the natural convection relation $$h = K'(G_r)^a(P_r)^b$$

where $K'$ = a constant
$(G_r)^a$ = Grashof's number to the power $a$
$(P_r)^b$ = Prandtl's number to the power $b$ For the condition of use it can be shown that $(G_r)^a \to$ constant, so that $$1/(P_r)^b = K''(T_p - T_a)$$

The Prandtl number varies drastically from air to liquid, so that changes in $T_a$ are not readily discernible and we can approximate $$T_p \cong K'''/(P_r)^b$$

When the probe is immersed in a liquid, it will stabilize at a temperature much lower than the stabilization temperature in air, since $P_r$ (for liquid) $>> P_r$ (for air).

FIGS. 15 to 18 inclusive, are transverse cross sections of alternate embodiments. In FIG. 15 the thermocouples wires, in this case, four thermocouples 51a, etc. are contained in a common sheath 52 together with a suitable refractory matrix of the kind to which reference has heretofore been made. The several thermoelectric junctions are spaced apart along the longitudinal axis in the same manner as in FIG. 2. The heater 53 is helically wound upon, or otherwise arranged, on the exterior of the sheath 52 or spaced therefrom. A housing 54 surrounds the heater. If desired, the same refractory matrix may fill the voids. FIG. 16 is similar to FIG. 15 except that the common sheath 52 has been omitted and the heater supported in the matrix. FIG. 17 shows an arrangement similar to FIGS. 15 and 16 except that here the heater 53a is on the exterior of the housing 54. FIG. 18 is similar to FIG. 10 except that the thermocouples 51a, etc. are unsheathed.

FIGS. 19 to 22 inclusive, illustrate two further modifications both characterized in that a rod 61 is utilized to support the heater 62 or 62a and thermocouples 63a, etc. The relative arrangement of the components and their function is believed to be evident from the preceding description. Again, it is to be noticed that, to conserve space, the showings of FIGS. 20 and 22 have been condensed vertically.

In FIGS. 23 and 24, there is illustrated an alternative form in which the heater 71 is of hairpin form and a single thermocouple 72 is employed. The housing and refractory matrix are as previously described. As referred to hereinabove, a single thermocouple may be used but the response curve is not regarded as practical for most applications. However, it will be apparent that the hairpin form of heater is applicable to those embodiments herein described in which a plurality of spaced-apart thermocouples is used.

Still another alternative is shown in FIGS. 25 and 26, this being characterized by the joining, as by welding, of the thermocouple 72a to the heater 71a.

While we have shown particular embodiments of our invention, it will be understood, of course, that we do not wish to be limited thereto since many modifications may be made and we, therefore, contemplate by the appended claims to cover any such modifications as fall within the true spirit and scope of our invention.

What is claimed is:

1. A device to sense variations in the level of a body of liquid to provide an electrical signal for controlling means which functions proportionately to the level comprising: a heat-conductive housing to be immersed in a vertically-fixed position in the liquid, a heating element and a thermoelectric junction contained in a protective sheath, both the junction and element being within said housing at such elevations as to be in heat-exchanging relation with the liquid and the ambient air above said liquid, the sheath, element and housing being juxtaposed, said junction sensing temperature as the same varies in proportion to the exposure of the housing to the liquid and the ambient air, means to supply current to said element, and means to apply the output voltage of the junction to the controlling means.

2. A device to sense variations in the level of a body of liquid to provide an electrical signal for controlling means which functions proportionately to the level comprising: a heat-conductive, elongated housing to be immersed in a vertically-fixed position in the liquid, a heating element and a plurality of thermoelectric junctions each contained in an individual protective sheath, both the element and the junctions being within said housing and the junctions being spaced apart longitudinally of the housing and connected as a thermopile to sense in a joint manner the temperature of the liquid and of the ambient air thereabove depending on the depth of immersion, said sheaths, element and housing being juxtaposed, means to supply current to said element and means to apply the output voltage of the thermopile to the controlling means.

3. The combination in accordance with claim 2 further characterized in that the heating element is contained in a heat-conductive sheath.

4. A device to sense variations in the level of a body of liquid to provide an electrical signal for controlling means which functions proportionately to the level comprising: a heat-conductive, elongated housing to be immersed in a vertically-fixed position in the liquid, a plurality of thermoelectric junctions carried within said housing, said junctions being spaced apart longitudinally of the housing, and an electrical heating element within said housing adapted to heat said housing and junctions, said housing being a cylindrical shell, the junctions being contained in individual cylindrical sheaths juxtaposed to the interior wall surface of the housing and the element being a cylindrical helix juxtaposed to the sheaths of said junctions, said junctions being connected in series to constitute a thermopile, means to supply current to said element, and means to apply the output voltage of the thermopile to the controlling means.

5. A device to sense variations in the level of a body of liquid to provide an electrical signal for controlling means which functions proportionately to the level comprising: a heat-conductive, elongated housing to be immersed in a vertically-fixed position in the liquid, a plurality of thermoelectric junctions carried within said housing, said junctions being spaced apart longitudinally of the housing, and an electrical heating element within said housing adapted to heat said housing and junctions, the element being a cylindrical helix juxtaposed to the interior wall surface of the housing, and the junctions being contained in individual sheaths located within the helix, said junctions being connected in series to constitute a thermopile, means to supply current to said element, and means to apply the output voltage of the thermopile to the controlling means.

References Cited by the Examiner
UNITED STATES PATENTS

| | | | |
|---|---|---|---|
| 2,279,043 | 4/1942 | Harrington | 73—295 |
| 2,702,476 | 2/1955 | Boisblanc | 73—295 |
| 3,118,136 | 1/1964 | Steele | 340—244 |

LOUIS R. PRINCE, *Primary Examiner.*

DONN McGIEHAN, *Assistant Examiner.*